United States Patent
Schuch et al.

(10) Patent No.: US 9,268,078 B2
(45) Date of Patent: Feb. 23, 2016

(54) COLOR-MIXING CONVERGENT OPTICAL SYSTEM

(75) Inventors: Michael Schuch, Kohfidisch (AT); Wolfgang Ernst, Vösendorf (AT); Alexander Otto, Bisamberg (AT)

(73) Assignee: Swarco Futurit Verkehssignalsysteme GES.M.B.H. (AT)

( * ) Notice: Subject to any disclaimer, the term of this patent is extended or adjusted under 35 U.S.C. 154(b) by 122 days.

(21) Appl. No.: 13/989,356

(22) PCT Filed: Nov. 17, 2011

(86) PCT No.: PCT/AT2011/000468
§ 371 (c)(1), (2), (4) Date: May 23, 2013

(87) PCT Pub. No.: WO2012/068603
PCT Pub. Date: May 31, 2012

(65) Prior Publication Data
US 2013/0258700 A1    Oct. 3, 2013

(30) Foreign Application Priority Data

Nov. 23, 2010   (AT) ................. A 1951/2010

(51) Int. Cl.
*G02B 6/00*   (2006.01)
*F21V 8/00*   (2006.01)
(Continued)

(52) U.S. Cl.
CPC ............ G02B 6/0005 (2013.01); G02B 6/0006 (2013.01); G02B 6/0068 (2013.01); G02B 6/4298 (2013.01); G09F 9/305 (2013.01)

(58) Field of Classification Search
CPC .. G02B 6/0005; G02B 6/0006; G02B 6/0008; G02B 6/0068; G02B 6/0073; G02B 6/0075; G02B 6/0076; G02B 6/0078; G02B 6/4298; G02B 9/305
USPC ........ 362/23.1, 511, 551, 552, 554, 555, 556, 362/558, 559, 561, 576, 582
See application file for complete search history.

(56) References Cited

U.S. PATENT DOCUMENTS 2,589,569 A * 3/1952 Peter et al. ..................... 362/576
2,825,260 A * 3/1958 O'brien ......................... 362/554
(Continued)

FOREIGN PATENT DOCUMENTS

| DE | 3500123 A1 | 7/1986 |
| DE | 102007055443 A1 | 6/2009 |
| GB | 649063 | 1/1951 |
| WO | 2004/057384 A1 | 7/2004 |

OTHER PUBLICATIONS

Wulf Luck, Authorized Officer, European Patent Office "International Search Report" in connection with related Application No. PCT/AT2011,000468, dated Mar. 16, 2012, 11 pages.
(Continued)

*Primary Examiner* — Y M Lee
(74) *Attorney, Agent, or Firm* — Kolisch Hartwell, P.C.

(57) ABSTRACT

Optical systems for focused light emission, which can be used as full color-capable pixels in grid assemblies, such as variable message signs and outdoor electronic display boards. The optical systems may include a light source that is a commercially available full-color LED in SMD design having a red, a green, and a blue LED crystal, which may be disposed at an inlet surface of a light-guiding rod having a constant cross-section and a jacket surface made of planes adjacent to each other at sharp edges. The light-guiding rod thereby captures the light substantially completely and completely mixes the different colors and brightnesses efficiently without scattering. The light output of the light-guiding rod lies at the focus of a convergent lens, which focuses the exiting light.

13 Claims, 2 Drawing Sheets

(51) Int. Cl.
 *G02B 6/42* (2006.01)
 *G09F 9/305* (2006.01)

(56) References Cited

U.S. PATENT DOCUMENTS 6,826,336 B2 * 11/2004 Guy ................................ 385/49
7,810,975 B2 * 10/2010 Specht et al. ................ 362/555
2006/0239037 A1 * 10/2006 Repetto et al. ................ 362/800
2007/0024971 A1 2/2007 Cassarly et al.

OTHER PUBLICATIONS

Yolaine Cussac, Authorized Officer, The International Bureau of WIPO, "International Preliminary Report on Patentability" in connection with related PCT Application No. PCT/AT2011/000468, dated May 28, 2013, 13 pages.

* cited by examiner

COLOR-MIXING CONVERGENT OPTICAL SYSTEM

FIELD OF THE INVENTION

The invention relates to a color- and light-mixing convergent optical system, in particular as a pixel capable of full color for imaging display boards outdoors, for spotlights or signaling, consisting of an LED light source, and also a light guide rod arranged in front thereof, and a convergent lens according to the preamble of claim 1.

BACKGROUND OF THE INVENTION

Inter alia, luminous points comprising a light source, in particular an LED, have been used heretofore for display boards outdoors which have to display variable contents, such as, for instance, so-called variable-message signs for influencing traffic. By means of electronic driving of the LEDs, luminous points can be switched on and off, and also represent gradual differences in brightness. These luminous points are either arranged in different light colors according to symbols to be represented such as traffic signs, for instance, or used over relatively large areas in a grid arrangement in order thus to be able to represent arbitrarily programmable graphics, texts or even images. The luminous points here function as so-called pixels.

In contrast to LED-based large-area video screens, which require a wide light emission for an audience situated in front of them, traffic representations are limited to much narrower emission or viewing angles since often they have to be viewed from a large distance only from one traffic lane. Moreover, they generally show constant displays and still images which change only infrequently. This results in considerable simplifications in terms of the driving electronics and in terms of the energy consumption, and hence much lower procurement and operating costs. However, greater viewing distances and weather influences also require higher light intensities; specific lighting requirements are also prescribed.

Whereas heretofore single-colored luminous points have usually been sufficient, and the small number of image representations have been implemented for instance from a combination of in each case one red, green and blue light point, combined as a color pixel, in a grid arrangement, in the future it is to be expected that more and more color representations with ever higher resolution will be desired and a pixel arrangement comprising three single-colored luminous points would be too large and too expensive.

In comparison therewith, in the case of LED large-format video screens, LEDs produced specifically therefor are used which contain the three primary colors red, green and blue in the form of three LED crystals in a common housing, wherein each color can be driven individually. In this case, the three colors have an identical emission characteristic achieved, for instance, by admixing scattering means into the LEDs. These so-called full-color LEDs or multi-LEDs have a planar light exit surface and are arranged in the pixel group. They emit their light as so-called cosine emitters, wherein the light is the most intense in the center and up to the edge at 90° decreases to zero gradually according to the function of a cosine curve. Since the light radiates hemispherically into a very large region, the brightness is rather low even in the center and moreover cannot be increased owing to the increasing outlay in respect of energy and cooling, for which reason such screens are only used indoors. Outdoors, large-format video screens are likewise implemented with specific, individual red, green and blue LEDs with an integrated, light-focusing lens dome and an oval design and light emission, since otherwise the necessary daylight brightness cannot be achieved economically.

In the case of all LED large screens, it is particularly important for the light emission of the LEDs to be implemented as identically as possible, since otherwise color shifts, color fringes, or color spots appear in the case of lateral viewing. It is very complicated to install individual single-colored LEDs with a lens dome such that they are all precisely aligned with one another, particularly if the LEDs still stand on wire feet.

The full-color LEDs or multi-LEDs are soldered as SMD design in a simple manner in the grid onto a suitable printed circuit board, which also results in an accurate level alignment; the light emission of the three LED crystals is already of an identical type.

It is then obvious to use the simple and cost-effective design of a full-color LED or multi-LED for high light powers as well, by means of the widely emitting light being focused in a simple manner by a convergent lens placed in front. However, this intention fails owing to the fact that the light from the three color crystals cannot be focused identically to one another by the lens placed in front, but rather each color aims in a different direction, in accordance with the arrangement of the crystals in the LED and the optical laws of imaging. The colors therefore have to be mixed well prior to focusing.

There are already proposals for the color mixing of different LEDs. JP 2008 047482 A (Epson) presents display lighting by means of edge irradiation with different-colored LEDs, polarization filter and color mixing. Here the objective is fundamentally different; after all, the color mixing without focusing of the light already arises in the multi-LEDs themselves.

It is also the case in the known advertising boards with edge irradiation by LEDs in different colors that very good color mixing without focusing arises automatically by virtue of the light from each LED being distributed over the entire display area by multiple reflection and scattering.

Room luminaires having red, green and blue LEDs also generate a uniformly mixed white, provided that they use LEDs having an identical emission characteristic and furthermore make them more uniform by additional scattering by means of structured cover plates, thus giving rise to a uniform light effect and color.

Color mixing without light focusing can thus be effected in a simple manner by means of light scattering. Mention should also be made of status displays on electronic devices, which use LEDs having a plurality of crystals which have for instance red and green and, as mixed color, yellow.

The light from these LEDs is guided by means of light guides to the housing surface and emitted there with wide scattering. Scattering also means, in principle, a loss of energy of the light, which is manifested in a reduced focusing capability, and also losses owing to light which, as a result of scattering, prematurely leaves the optical system and cannot be utilized.

However, an arrangement for focused mixed light is already known as well. US 2010 020565 A1 (Seward) proposes completely mixing the different-colored light from the LEDs in a small (Ulbricht) sphere and guiding it through a light guide rod into a highly focusing convergent optical system. In practice, the proposal fails owing to the high scattered-light losses at the walls of the sphere, and the required structural size and the outlay for this arrangement.

In principle, light transmission by means of a light guide, at one end of which a light source introduces radiation and at the other end of which the light being emitted is distributed by an optical system, has already been known for a long time. However, this basic system can be modified by an enormously large number of parameters, such that an immense diversity of qualities and design possibilities arises.

If the properties of a light guide are considered, then it is generally assumed, besides many other properties, that said light guide mixes the light "per se" and therefore functions, in principle, as light color or intensity mixer, such as, for instance, a rough surface or a translucent, diffuse material, such as milk glass, for example. In actual fact, a light guide is a highly transparent, thoroughly precise optical element which, in terms of its function, is no different from an optical lens, an optical prism or other optical objects. In its interior, a precisely determinable beam path takes place which depends only on the type of light source and the effect thereof on the entrance surface.

The impression of a "mixing" property arises by virtue of the fact that the light is forwarded by multiple total reflection at the light guide walls and therefore surface tolerances have a very high influence on the result, since even tiny angular errors of the wall surfaces are doubled in the course of total reflection and the "series connection" of the numerous reflections leads to further tolerances of the light deflection. Therefore, long light guides actually have a mixing effect that arises as a result of unavoidable manufacturing tolerances. However, short light guides manufactured with very high precision have no mixing effect whatsoever, as a result of which they act on the light like optical lenses or prisms.

Another criterion is the efficiency of the system light source-light guide-distribution. If virtually every light ray from the light source is guided through the light guide and emitted usefully, then the efficiency is almost 100%. In practice, not all of the light rays pass into the optical waveguide; they miss the entrance surface or are reflected back at the latter. The materials and surfaces also absorb part of the light, and in the course of distribution many light rays will also radiate into regions not required. In particular, fiber-bundle light guides have so-called "interstitial losses" between the round fibers, in which case although light radiates forth, it is not forwarded. Likewise, the cladding layer of a fiber composed of low refractive index material is also unable to forward light.

A further criterion is the optical effect of a light guide. If the light guide widens, then the light is focused since the axial angle of each light ray is reduced upon each reflection at the wall. If it narrows, however, the light is scattered, in which case the "aperture" of the light guide is exceeded very rapidly. The light then impinges on the reflection walls at angles that become steeper and steeper, until the light can emerge laterally from the light guide and is lost.

EP 0 596 865 A2 discloses a device for emitting light, wherein an optical element and as light source an LED are used. In that case, it should be taken into consideration that glass-fiber optical waveguides are used for transmitting the light, and they can also have virtually arbitrary bends. The emission angle of the overall light beam is influenced by selectively switching on different LEDs. Furthermore, said glass-fiber optical waveguides, preferably fiber bundles, considered by themselves, each have a circular cross section.

US 2009/0052189 A1 discloses an arrangement for producing a spotlight with high focusing and simultaneous mixing of the primary colors (R, G, B). This LED emitter comprises an LED light source having a plurality of LED crystals, a rod lens having the function of a light guide rod, and an optical element. To that effect, US 2009/0052189 A1 discloses a known basic arrangement, supplemented by a "first" focusing optical system, which focuses the light emitted by the LED light source onto the entrance surface of a square light guide rod, which tapers conically and the exit surface of which is situated at the focus of a reflector. In that case, the primary convergent lens is arranged in front of the light guide rod and the light of the LED is focused onto the entrance surface thereof; furthermore, the rod lens has a tapering cross-sectional form from the LED light source to the lens. Consequently, in US 2009/0052189 A1, a reflector is primarily used since the conically tapering light guide rod emits the light into a hemisphere, which can be focused more easily by a reflector. However, in the case of the second convergent system presented in US 2009/0052189 A1, by means of dichroic mirrors, the light is already premixed. These essential differences are substantiated in the objective of US 2009/0052189 A1 to achieve a maximum focusing, while a specific light distribution is intended to be achieved with the present invention.

By contrast, WO 2006/054199 A1 discloses a light source comprising a light engine having at least one LED and/or at least one laser light emitting element, for generating and coupling in light, in at least one light guide comprising at least one coupling-out element for coupling out the light.

DETAILED DESCRIPTION OF THE INVENTION

Figure 1:
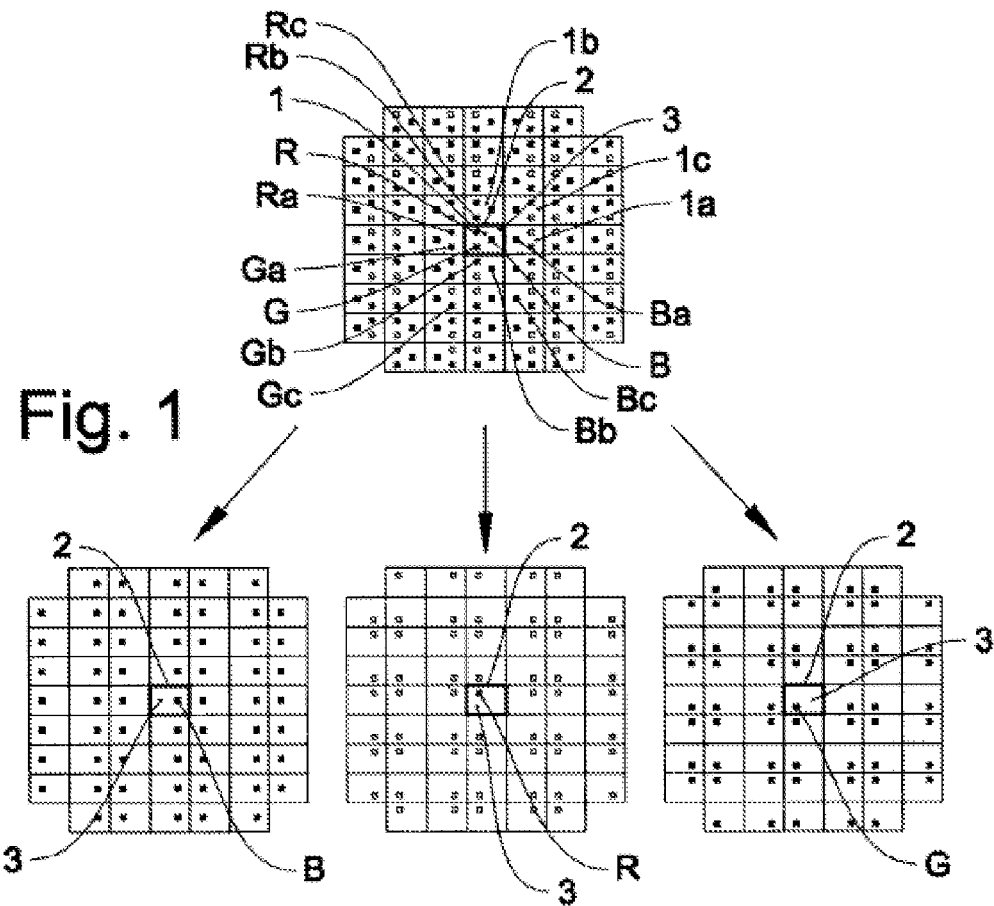
FIG. 1 is a plan view of a grid of mirror images of a light source, according to an embodiment of the present invention.

It is an object of the invention to construct an optical system which completely intermixes the light from the different LED crystals of such a full-color LED or multi-LED such that its intensity and direction are maintained in a small space and can subsequently be focused in a known manner, without forming color differences, color fringes or color spots for the observer, and in this case the arrangement must be cost-effective and small.

That is implemented in the manner according to the invention in that the LED light source contains a plurality of LED crystals, wherein the light entrance surface of the light guide rod is arranged in front of the light exit surface of the light source and captures light from each crystal, in that the light guide rod extends perpendicularly to the entrance surface thereof, its cross section is constant or gradually increases, and the light exit of the light guide rod is situated in the region of the focus of the convergent lens placed in front. With regard to the wording "in the region of the focus", it is noted that from a technical standpoint the light exit surface coincides as far as possible with the focus or lies in the region directly surrounding the focus. Furthermore, according to the invention, the length of the light guide rod is a multiple of the diameter of the entrance surface.

The present invention is based on the use of a commercially available RGB-LED having crystals in the three primary colors red, green, blue (R, G, B) for generating light with arbitrary color mixing. While the LED itself fulfils the demands of color mixing by virtue of the fact that it emits the light from each crystal as a so-called cosine emitter over a hemisphere, it no longer fulfils this light mixing if a light-focusing optical system or an objective lens is placed in front in order to focus and thereby amplify the light emission in a specific direction. This is because the crystals each generate a color spot in the projection. However, these color spots are not congruent on account of the arrangement of the crystals alongside one another and, therefore, the focused light does not appear in the mixed color, but rather with color spots.

It is therefore necessary to "mix" the three light colors and brightnesses by means of an additional optical element between LED and optical system in order to obtain a uniform mixed color. In this case, the intention is to achieve maximum effectiveness and, of course, a cost-effective embodiment of the optical element, which is then used in high numbers as pixels of a display board. High efficiency reduces the power consumption and the heating of the display board and thus the cooling outlay and the operating costs.

The heart of the invention is therefore the use of a specially designed light guide rod which is situated directly at the LED, takes up all of the light thereof, carries out "mixing" and opens directly integrally into the convergent optical system, as a result of which, on the one hand, the highest possible efficiency is provided and, on the other hand, the capability of focusing the light is also not lost, with the result that the diameter of the optical system does not become greater than that of the previous optical systems with single-colored LEDs having an identical design or housing size.

The light emerging from the LED light source immediately enters into the entrance surface at the end face of the light guide rod. Its angular range is thereby reduced from +/−90° (hemisphere) by the light refraction depending on the refractive index of the light guide material to an angle of, for example, +/−42° with respect to the axis for instance with the use of Plexiglas. As is known, this angle is calculated as the arc sine of the reciprocal of the refractive index. The light guide rod can be manufactured from any suitable transparent plastics or glasses.

Given a constant cross section of the light guide rod, the light then impinges on the walls at a maximum of said 42°, for which reason it is totally reflected since passage through the side surfaces is possible here only starting from approximately 48° with respect to the axis. It thus passes as far as the light exit of the light guide rod in a known manner by means of multiple lossless total reflection at the walls of said light guide rod, which light exit can indeed be of the same size as the entrance surface, and in this case the light is mixed by the geometrical configuration of the light guide rod. Without further measures, the light upon emerging would be fanned out again to +/−90°. The light exit can therefore be regarded like the LED exit surface, but with intermixed light, and can be focused by means of a convergent lens in a known manner. The intermixing therefore takes place substantially without light losses.

The intermixing is a consequence of the cladding design and length of the light guide rod. Owing to the large number of possible cross sections, the description of the mode of operation will be limited to a few simple assumptions, but this does not constitute any restriction of the scope of protection.

In principle, every light guide mixes the incident light uniformly over the light exit after a specific distance has been covered. The cause is, besides the geometrical design, primarily small geometrical deviations of the surfaces, surface roughness, inclusions in the material or a curvature of the light guide rod, which influence the reflection angles and thus contribute to the mixing of the light. However, these scatterings also provide for losses if the reflection angles are altered to such an extent that light is no longer totally reflected and is lost as a result of lateral emergence. In addition, the longer the light guide, the more light is also lost as a result of absorption in the material.

In the application according to the invention, the length of the light guide rod is expediently kept as short as necessary. The mixing is brought about solely by the light guide geometry; deviations of the geometry or of the material for improving the mixing by a scattering effect reduce the efficiency and are neither desirable nor necessary here. The light guide rod furthermore distributes the light from each crystal within the same light guide length uniformly over the light exit, independently of whether a crystal is positioned centrally or in the edge region of the entrance surface.

Figure 2:
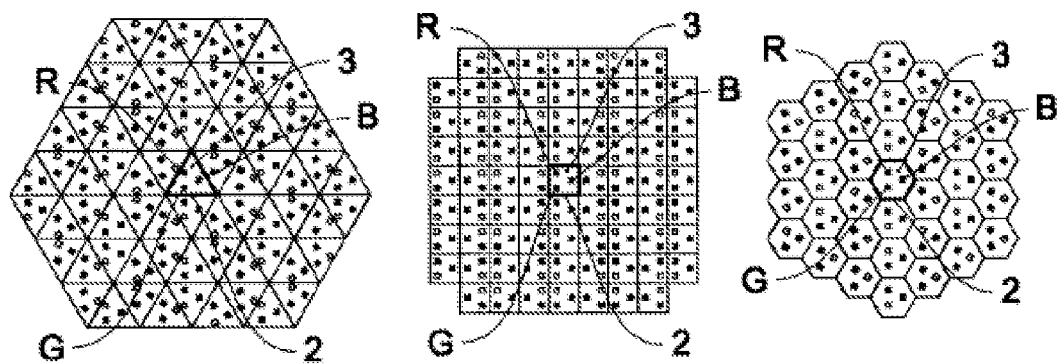
FIG. 2 is a plan view of an alternative grid of mirror images of a light source, according to another embodiment of the present invention.
Figure 4:
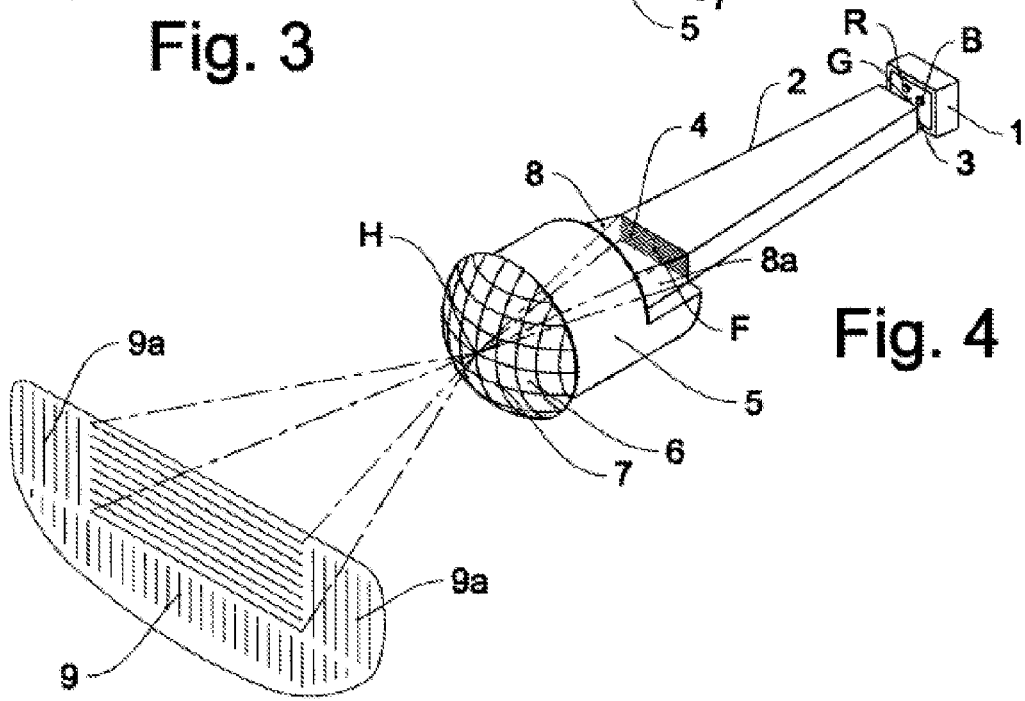
FIG. 4 is a perspective view of a convergent optical system according to an alternative embodiment of the present invention.
Figure 5:
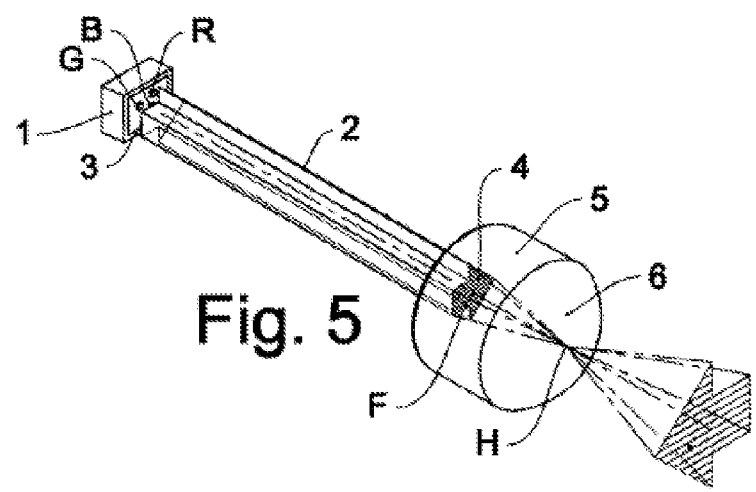
FIG. 5 is a perspective view of a convergent optical system according to yet another embodiment of the present invention.

The invention will now be explained with reference to the drawing. FIG. 1 and FIG. 2 show plan views of different grids of mirror images of the light source, FIG. 3 shows a section through an arrangement according to the invention together with the beam path, and FIGS. 4 and 5 show optical systems according to the invention in an illustrative representation.

Figure 3:
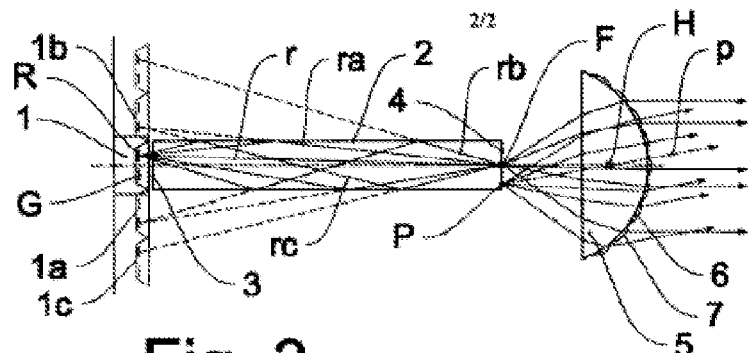
FIG. 3 is a sectional view of a convergent optical system and its associated beam path according to an embodiment of the present invention.

If a light guide rod having a constant, rectangular cross section in front of a light source having a light exit of approximately the same size is initially assumed, as also illustrated in FIG. 3, then the effect thereof can be described as follows with reference to FIG. 1:

If one looks conceptually from directly within the light exit 4 of the light guide rod 2 toward the light source 1, then the light guide rod 2 appears as a rectangular tube composed of plane mirrors owing to the total reflection at the sides. The light source 1 visible through the light entrance surface 3 is mirrored not just at all four side walls, rather a rectangular pattern of mirror images 1a, 1b, 1c ... of the same light source 1 arises as a result of multiple mirroring of the mirror surfaces situated opposite and parallel. This is an effect comparable with looking into a so-called kaleidoscope. The light source 1 here has three crystals, R, G, B of different colors, in particular red, green and blue, the mirror images Ra, Rb, Rc, ... Ga, Gb, Gc ... Ba, Bb, Bc ... of which are likewise depicted. If the light guide rod 2 is embodied with sharp edges, then it is possible to look at all mirror images without being obstructed. In the case of larger edge radii, some mirror images would be covered by the radius, or reflections would occur at the radii themselves, as a result of which the representation would be impaired.

If the LED crystal R, G, B is not situated in the center of the entrance surface 3, then some mirror images lie closer together, and others lie further apart, but nothing significant changes on average since each mirror image remains, of course, within its concomitantly mirrored rectangular entrance surface. The field of the mirror images is limited by the material-dependent critical angle of total reflection, with approximately 42° for Plexiglas, and LED mirror images assumed to be further outward can no longer radiate light to the light exit and are therefore nonexistent. The longer the light guide rod 2, then the further away the observer is, the larger the visible field of mirror images, the smaller the differences in viewing angle between the mirror images, and the greater the uniformity overall. The restriction of visibility by the critical angle of total reflection therefore requires a length of the light guide rod 2 such that a sufficient number of mirror images for the desired uniformity of the mixing lie in the field of view. In this case, the pictorial representation can serve as a point of reference; in one direction 7 and in the other direction 9 mirror images together with original can be discerned. With inclusion of the critical angle of approximately 42°, it can be assumed that a light guide rod 2 which is 8 to 10 times longer than the size of its entrance surface 3 yields very good mixing results. That is a light guide rod length of only approximately 20 mm with the use of commercially available full-color LEDs for large-screen video displays.

Every mirror image, like the original as well, emits a full beam of light rays within the angular range of up to approximately 42°, therefore also to every point of the light exit. The light beams differ only with regard to the intensity and often also their color depending on their emission direction. When a sufficient number of mirror images are present, this gives rise to an extremely uniform illumination of the light exit by the sum of the light ray beams of each color and from every direction of a mirror image and the direction-dependent brightness of the LED crystals. Even the positional differences of the LED crystals within the light source balance out since on average one mirror image is nearer and in return the next is further away, which almost completely cancels out in the overall effect. By means of a longer length of the light guide rod, the quality of the mixing can be further improved owing to the increase in the number of mirror images.

FIG. 1 also shows that not only does the total view of the mirror images give the impression of a uniform distribution, but also each color by itself is distributed relatively uniformly and regularly within the total view, as illustrated by the three views separately according to R, G and B. Directly before the light emerges from the light guide rod 2, therefore, a uniformly bright distribution of the light in mixed color prevails, within the critical angle of approximately 42°.

The view of the field of the mirror images from within the light exit 4 is actually the sum of the views in all possible directions of one and the same light source 1, as a result of which an average overall impression of color and brightness is established, which is entirely equal to a physical mixing of all the light rays for instance by diffuse scattering.

All light rays that have entered into the light guide rod emerge again at the same angle from the light exit of the same size. Therefore, the color and brightness mixing is effected without losses apart from the physically unavoidable interfacial and light guiding losses in the material; the efficiency of subsequent focusing is therefore high substantially without change.

It is obvious that there arise such fields of mirror images with geometrical forms of the light guide rod which can fill a plane without gaps and uniformly, that is to say equilateral triangle, rectangle and square, and regular hexagon, as illustrated in FIG. 2. These light guide rod cross sections produce in each case a gap- and overlap-free area of mirror images with a regular grid arrangement, provided that the mirror surfaces also adjoin one another with sharp edges. In this case, the intermixing of the colors and brightnesses arises, as described above, neither as a result of mixing processes nor as a result of a scattering effect, but rather as a result of a virtual regular arrangement of structurally identical light sources as mirror images of one and the same light source which send their light to the light exit. The focusability is likewise fully maintained because the entrance and exit cross sections of the light guide rod can be of the same size. In addition, since the effect of the crystal position largely balances out on average, the dependence of the mixing result thereon is also extremely small.

Uniform intermixing by itself is not the only criterion for the optical design, since the emission direction of the light rays downstream of the light exit also has to be taken into account. In the case of a regular arrangement of discrete mirror images of the LED crystals, the light rays also emerge in the associated discrete directions; in contrast to emergence from the light source, therefore, they no longer constitute a homogeneously divergent light beam. Without an optical system placed in front, the emitted light would generate a pattern of bright light points, since each mirror image of the LED generates its own light beam through the light exit in the respective emission direction. This effect is a consequence of the present mixing method. In the case of genuine intermixing of all the light rays, the light beam would be just as homogeneous as also during emergence from the light source itself.

FIG. 3 shows this circumstance in a simplified form for the light from an LED crystal R by virtue of the fact that, for reasons of clarity, only axial light rays r, ra, rb, rc . . . are illustrated, each being representative of a narrow light ray beam. The light of the mirror images that is emitted through the light exit 4 forms a bundle of narrow individual beams. That is illustrated for the center point F of the light exit, and also for an arbitrarily laterally situated point P of the light exit, for which the emission direction of the narrow light beams changes only slightly.

If a convergent lens 5 is positioned downstream of the light guide rod 2 such that the light exit 4 is situated exactly at the focus F of said lens, then the divergent light ray beams present at every point P of the light exit 4 are focused by the convergent lens in the direction p corresponding to said point P through the so-called principal point H of the convergent lens 5. The light ray beams passing through the center point of the light exit F are aligned in an axially parallel manner. The beams of those points of the light exit which are situated laterally with respect thereto are directed in a parallel manner in the associated directions p. The light exit 4 is therefore projected into infinity according to the optical laws, every point P of the light exit 4 being imaged in a direction p determined according to the optical laws, independently of the direction exhibited by the individual light rays emerging from said point. The light distribution of this optical arrangement is therefore a uniformly bright, identically colored, upside-down region in the shape of the light exit 4.

This light distribution can be further adapted to the requirements by means of optically active geometries or scattering structures in the region of the convergent lens 5. It is obvious that the light exit is already intended to have a shape that is favorable for the desired further light distribution and scattering. By way of example, the distribution can be scattered widthways by ribs or knobs 7 on the exit surface 6 of the convergent lens 5. The for the time being uniform brightness is thus modified and widened with regard to a desired brightness distribution, without impairing the mixed color.

In a further configuration of the invention, the light guide rod 2 can also widen conically. As known, as a result the light in the light guide rod is focused by virtue of the fact that the inclination of each light ray with respect to the axis, upon each total reflection at the wall, is reduced by twice the value of the cone angle prevailing there. In the case of a rectangular cross section, focusing can be effected in a horizontal direction, vertical direction or omnidirectionally. The light exit 4 is thus correspondingly enlarged relative to the entrance surface 3. If one looks through it into the light guide rod 2, then the grate-like arrangement of the mirror images curves away from the observer in one or both directions. In this case, the reduction of the light ray angles leads to a reduction of the number of active mirror images, which can be compensated for by an adequate lengthening of the light guide rod 2. However, the mixing itself functions exactly as before. The enlargement of the light exit 4 results in an aliquot reduction of the luminance, but in return a higher output focusing of the light.

The outlined embodiments of light guide rod cross sections have the same functional principle. However, it is also possible to use any other cross sections, even those with crooked boundary surfaces. The individual mirror images then turn into distorted figures, often no longer discernible as mirror images, the mixing can then only be seen as an integral over differential mirror images, and overlaps or gaps occur in the mirror images. Therefore, the mixing is usually distinctly poorer and totally unclear in terms of the functioning. The necessary length of such a light guide rod can then only be determined by means of simulation or experiment.

In this case, a very poor intermixing has a circular cross section since a light ray which passes through the center once again only passes through the center after each reflection, and a light ray which goes past the center is only ever reflected around in a circle. An improvement then relies on the additional scattering effect as a result of tolerances of the geometry, surface roughness, discontinuities in the material or a curvature of the light guide rod. It is therefore recommended, wherever possible, to chose polygons having a cross section according to the invention in order not to have to rely on the lossy scattering effects. In the case of such and other, non-circular, cross sections, the equivalent radius should be taken as radius. Said equivalent radius is the radius of a circle having the same cross-sectional area as the cross section under consideration.

In a further configuration of the invention, the light exit 4 can be present only virtually; the convergent lens 5 directly and integrally adjoins the light guide rod 2. Thus, the light does not have to exit from the light guide and enter into the convergent lens again, but rather can continue without interfacial losses until it emerges from the convergent lens. This design is very compact and efficient.

A further configuration concerns the use of optically active geometries in the region of the convergent lens. If, for instance, the exit surface of the convergent lens is superimposed with a structure, then the light image is modified or scattered by said structure. However, it is also possible to direct part of the light into other zones, which otherwise remain dark, between the virtual light exit and the exit surface of the convergent lens for instance by means of totally reflective surfaces. Choosing the geometry of the light guide cross section such that exactly the desired light distribution is obtained together with simple light-directing measures can be solved by means of computer simulation, in particular.

FIG. 4 shows an optical system with the abovementioned configurations in front of a full-color LED light source 1. The light guide rod 2 widens conically in the horizontal direction, and it is kept constant vertically. The position of the light exit 4 is determined by the lower and upper ends of the light guide rod 2. The light exit 4 is present only virtually since the material extends further as far as the exit dome 6 of the convergent lens 5, the focus of which lies in the virtual light exit 4. An inclined surface 8 is attached adjacent to the light guide rod 2 at the top side, said surface generating a mirror image of the virtual light exit adjoining directly above, and the side surfaces 8a of the light guide rod are likewise continued, wherein they, too, generate an adjoining mirror image of the virtual light exit. The projection of the light exit 4 via the convergent lens 5 into infinity reverses the directions; it therefore has light surfaces 9, 9a which still continue laterally and below the projected rectangle and which arise as a result of the mirroring of the exit at the surfaces 8 and 8a, for which reason in total a substantially triangular light distribution arises here. The mirrored surfaces 9, 9a are only partly present and also have a brightness gradient because only a portion of the light rays from the light exit 4 can actually reach the reflection surfaces 8, 8a as a result of the angle limitation to approximately 42°. One great advantage of these adjoining mirror surfaces is the seamless transition in the light distribution between the image of the light exit and the mirrored surfaces 9, 9a. The dome 6 of the convergent lens 5 can be superimposed with a scattering structure 7, which overall brings about a slight scattering effect and, consequently, not only renders the light distribution more uniform but also produces a profile at the edges of the light distribution.

The selection of the best suited cross section and the arrangement of the LED crystals in the light source itself is an issue relating to the boundary conditions and the required light distribution, and the design of the optical systems.

A freely defined cross section can be justified primarily in terms of its exit geometry, where together with the convergent lens 5 a particular light distribution is required. It is thus possible, for instance, as illustrated in FIG. 5, to choose for the light guide cross section a cross or arrow shape or any other arbitrary symbol, which is then projected by the convergent lens 5 onto a screen or into infinity, with uniform brightness and uniform color that can be varied arbitrarily. By comparison with a solution using a covering mask, the direct generation of the luminous symbol is lossless and has correspondingly high light intensity.

With a light guide cross section of arbitrary design it is also necessary to investigate whether the LED crystals in the center are mixed with varying degrees of quality in comparison with crystals in edge regions. If appropriate, a longer light guide rod 2 must be provided.

Instead of the full-color LED or multi-LED, it is equally possible to provide individual small LEDs, for example so-called chip-LEDs, in a dense arrangement. In this case, arbitrary individual colors can be combined. The use of identical colors is also possible in order to increase the total brightness, but also in order to construct a redundant light source having a plurality of crystals, for instance for safety tasks. Upon the failure of one LED or switch-over to the other, no change in the light distribution or in the appearance is discernible. However, as necessary the color could also be changed in a desired manner.

It goes without saying that the light source of the optical system can also be equipped with only one LED crystal. Even for an individual color the same light distribution is generated at lower costs, since full-color display boards often have adjoining single-colored regions, for instance for additional text.

White LEDs are often criticized owing to the fact that bluish light from the blue LED crystal is emitted in the center, but yellowish light from the conversion compound is emitted toward the edge. The optical system according to the invention completely mixes even these color differences governed by the LED construction, since the inhomogeneously luminous area of the white LEDs can always be regarded as an overall arrangement of a plurality of LED crystals having different colors and brightnesses.

The invention presented can, of course, also be used in arbitrary other applications; by way of example, it is possible to use optical systems in a dense arrangement as stage spotlights with a color changer, or as a spotlight in the area of general or effect lighting, but also as flashlights or signal lights. For this purpose, the optical system is also arbitrarily scaleable, such that it is possible to use powerful LEDs which are likewise obtainable with a plurality of LED crystals in a common housing or in a chip-on-board design with a planar exit surface.

The invention claimed is:

1. A convergent optical system, comprising:
   an LED light source including a plurality of LED crystals that emit different colors, wherein the LED light source has a light exit surface;
   a light guide rod having a light entrance surface and a light exit surface; wherein
      the light guide rod extends in a direction that is substantially perpendicular to the light entrance surface; and
      the light guide rod has a cross-section area that is constant or that gradually increases along the light guide rod from the light entrance surface; and
   a convergent lens having a focal point; wherein
      the light entrance surface of the light guide rod is disposed in front of the light exit surface of the LED light source so as to capture light from each LED crystal; and
      the light exit of the light guide rod is situated in the region of the focal point of the convergent lens.

2. The convergent optical system of claim 1, wherein the light guide rod has a length that is a multiple of the diameter of the light entrance surface.

3. The convergent optical system of claim 1, wherein the light source includes a full-color LED, or a multi-LED having a number of crystals and/or colors disposed in a common housing.

4. The convergent optical system of claim 3, wherein the light source includes a full-color LED or a multi-LED having three crystals in the primary colors red, green and blue.

5. The convergent optical system of claim 1, wherein the light source includes a plurality of LEDs in a dense arrangement, each of the plurality of LEDs incorporating individual crystals, and each of the plurality of LEDs having the same emission direction.

6. The convergent optical system of claim 1, wherein the light source includes a plurality of crystals mounted on a printed circuit board by using chip-on-board technology.

7. The convergent optical system of claim 1, wherein the plurality of LED crystals are powered by a plurality of electrically isolated power sources in such a way that upon a loss of power to an LED crystal, at least one other LED crystal remains powered.

8. The convergent optical system of claim 7, wherein the loss of power to an LED crystal results in a detectable color change in the emission of the convergent optical system.

9. The convergent optical system of claim 1, wherein the light exit surface of the LED light source adjoins the light entrance surface of the light guide rod.

10. The convergent optical system of claim 1, wherein the light guide rod further comprises a cladding surface formed from a plurality of planes adjoining one another in a sharp-edged fashion such that each cross-section of the light guide rod defines the form of a polygon.

11. The convergent optical system of claim 10, wherein each cross-section of the light guide rod defines an equilateral triangle, a regular hexagon, a square, or a rectangle.

12. The convergent optical system of claim 9, wherein the cross-section of the light guide rod defines a polygon that remains constant or gradually widens over the length of the light guide rod.

13. The convergent optical system of claim 1, wherein the optical system is configured to function as a full-color pixel in an electronic display board, a spotlight, or a signaling light.

* * * * *